Sept. 23, 1969     T. A. G. HUMPHREYS     3,469,129
PERMANENT MAGNET ELECTRIC MOTORS
Filed May 25, 1967     2 Sheets-Sheet 1
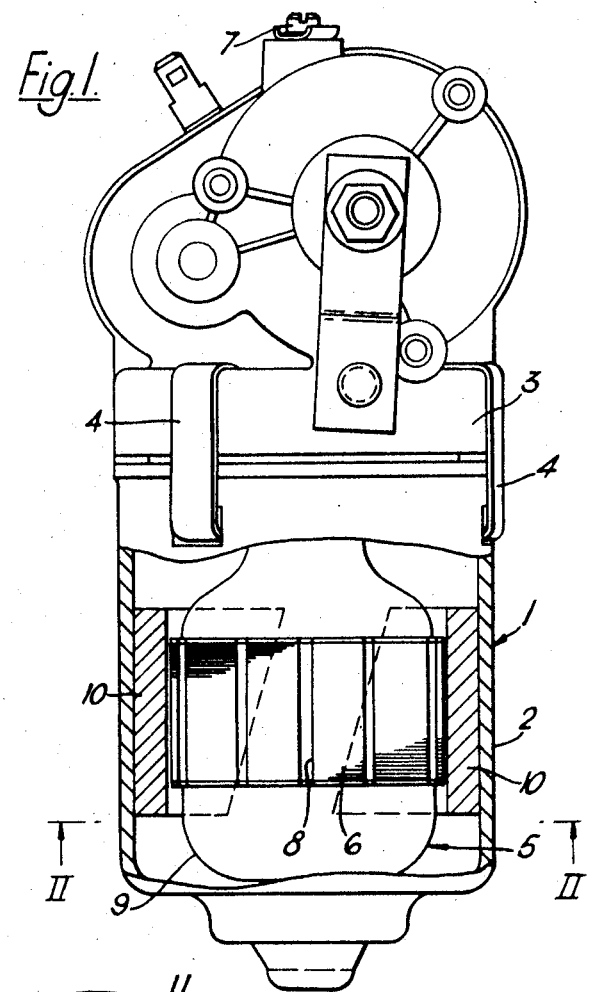
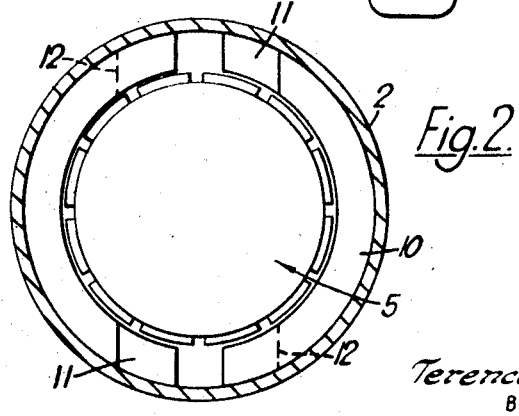
Inventor
Terence Arthur George Humphreys
BY
Donald P. Selwacki
Attorney Sept. 23, 1969  T. A. G. HUMPHREYS  3,469,129
PERMANENT MAGNET ELECTRIC MOTORS
Filed May 25, 1967  2 Sheets-Sheet 2
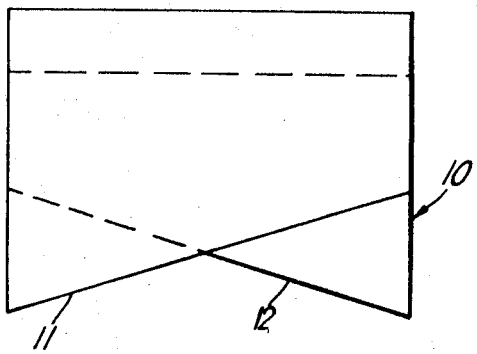
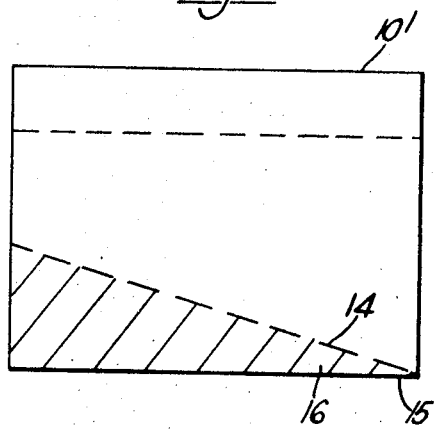
Inventor
Terence Arthur George Humphreys
BY
Donald P. Selnecke
Attorney United States Patent Office 3,469,129
Patented Sept. 23, 1969

3,469,129
PERMANENT MAGNET ELECTRIC MOTORS
Terence Arthur George Humphreys, Dunstable, England, assignor to General Motors Corporation, Detroit, Mich., a corporation of Delaware
Filed May 25, 1967, Ser. No. 641,341
Claims priority, application Great Britain, May 26, 1966, 23,645/66
Int. Cl. H02k 23/04
U.S. Cl. 310—154                                5 Claims

ABSTRACT OF THE DISCLOSURE

A direct current electrical motor having an armature with winding receiving slots extending parallel to the longitudinal axis of the armature shaft and a permanent magnetic field having the longitudinal boundaries of the magnetized material skewed relative to the longitudinal axis of the armature.

STATE OF THE PRIOR ART

British Patents 923,477, Ford; and 949,820, Bosch both show part cylindrical permanent magnets with straight ends.

SUMMARY AND DESCRIPTION OF INVENTION

This invention relates to permanent magnet electric motors and in particular to a permanent magnet direct current motor such as is suitable for use in driving an electric windscreen wiper mechanism.

A permanent magnet electric motor according to the invention has armature winding slots parallel to the armature axis and a magnet constructed so that the longitudinal boundaries of the magnetised material thereof are skewed relative to the armature axis.

Thus, the ends of the magnet may be skewed relative to the armature axis, so that, instead of lying in a common plane, they lie respectively in planes which intersect each other intermediate the transverse ends of the magnet; or the portion of the material to form the magnet may have its ends lying in a common plane but be magnetised in such a way that at each end a portion of approximately triangular form is not magnetised, so that the longitudinal boundaries of the magnetised portion are at an angle to the armature axis.

Conveniently there are two permanent magnets of part cylindrical form which are arranged with their outer peripheral surfaces in contact with the inner periphery of the cylindrical housing of the motor, the one circumferential end of each magnet being oppositely skewed from its opposite end and the two magnets being arranged so that the skewed ends of one magnet are spaced from those of the other.

The scope of the invention is defined by the appended claims; and the invention and the method by which it is to be performed are hereinafter particularly described with reference to the accompanying drawings, in which:

FIGURE 1 is a part sectional elevation of a windscreen wiper drive mechanism including a permanent magnet electric motor according to the invention;

FIGURE 2 is a view on the line 2—2 of FIGURE 1, with the motor armature removed for the sake of clarity;

FIGURE 3 is an elevation to a larger scale of one of the permanent magnets shown in FIGURES 1 and 2; and FIGURE 4 is an elevation of a modified form of construction of the permanent magnet shown in FIGURE 3.

The windscreen wiper drive mechanism shown in FIGURE 1 includes a permanent magnet electric motor comprising a two-part housing 1 including a cup shaped housing part 2 the open end of which is closed by a combined end cover and gear case 3 which is secured to the housing part 2 by spring clips 4.

Mounted in the housing is a permanent magnet electric motor having a rotary armature 5 with a laminated core 6 mounted on a shaft 7 which is rotatable in bearings (not shown) in the housing members 2 and 3. The armature core 6 is formed with coil-winding slots 8 which are parallel to the longitudinal axis of the armature and carry therein coil windings, the outline only of which is indicated at 9.

The magnetic field for the motor is provided by two arcuate permanent magnets 10, which are secured, as by adhesive, to the wall of the cup-shaped housing member 2.

The permanent magnets 10 are each of part cylindrical form, as shown in FIGURES 2 and 3, and are arranged with their outer peripheral surfaces in contact with the inner periphery of the cylindrical housing part 2 of the motor, the one circumferential end 11 of each magnet being oppositely skewed from its opposite end 12, and the two magnets 10 being arranged so that the skewed ends 11, 12 of one magnet are parallel to but spaced from those of the other. Thus, the longitudinal boundaries of the magnetised material of the magnets 10 are skewed relative to the armature axis.

The amount by which the ends of the magnets are skewed may be varied according to the amount by which it is preferred to overlap, at one end of the magnet, the winding in a slot 8 which at the other end of the magnet is in alignment with the gap between the two magnets.

In the particular embodiment shown the magnets are portions of a cylinder the internal radius of which is approximately 1.04 inch and the external radius is approximately 1.32 inch, the length being approximately 1.5 inch and the skewed circumferential ends each extendnig at approximately 18° relative to the longitudinal axis of the magnet.

The magnets are preferably made of a ceramic material such as barium ferrite and can be readily moulded to the desired shape. They are radially magnetised so that the outer and inner arcuate surfaces are of opposite polarity.

FIGURE 4 shows an alternative form of construction of the magnet which is magnetised so that the circumferential boundaries of the magnet are skewed relative to the armature axis but in which the physical ends of the magnet lie in a common plane. The drawings shows a magnet 10' which, as in the form of construction shown in FIGURES 2 and 3 is of part cylindrical form but in this case has its circumferential ends parallel to each other and to the axis of the cylinder of which it forms a part. FIGURE 4 is an elevation of the magnet 10' seen from one side thereof, the dotted line 14 indicating the boundary of the magnetised portion of the material of the magnet 10', which lies at an angle to the free end 15 of the magnet, the hatched portion 16 below the line 14 indicating that portion of the material at the end of the magnet which is non-magnetised. It will be understood that the elevation of the magnet from the other side thereof will be the same as shown in FIGURE 4. The desired boundaries of the magnetised area of the magnetic material are readily obtained by magnetically masking or blanking off triangular portions of the material when it is magnetised.

The employment of permanent magnets of the construction described above ensures that the permanent magnet motor will operate without the so-called "cogging" or jerky operation of the motor which would otherwise be caused by the employment of armatures with slots in alignment with the armature axis, and magnets with ends parallel to the armature axis. The invention also avoids the necessity for the more expensive and complicated expedient of winding the armature coils on an armature core having skewed armature slots.

I claim:

1. A permanent magnet electric motor having an armature with winding slots parallel to the armature axis and at least one permanent magnet constructed so that the longitudinal boundaries of the magnetised material thereof are skewed relative to the armature axis.

2. A permanent magnet electric motor having an armature with winding slots therein parallel to the armature axis and at least one permanent magnet the ends of which containing the longitudinal boundaries of the magnetised material thereof are skewed relative to the armature axis so that they lie respectively in planes which intersect each other intermediate the transverse ends of the magnet.

3. A permanent magnet electric motor having an armature with winding slots parallel to the armature axis and a magnet which has the ends thereof containing the longitudinal boundaries of the magnetised material thereof lying in a common plane but which has said material magnetised in such a way that at each said end of the magnet a portion of approximately triangular form is not magnetised, so that the longitudinal boundaries of the magnetised portion are at an angle to the armature axis.

4. A permanent magnet electric motor according to claim 1, in which there are two of said permanent magnets each of part cylindrical form, arranged with their outer peripheral surfaces in contact with the inner periphery of a cylindrical housing of the motor, the one circumferential end of each magnet being oppositely skewed from its opposite end and the two magnets being arranged so that the skewed ends of one magnet are spaced from those of the other.

5. A permanent magnet electric motor according to claim 3, in which there are two of said permanent magnets, each of part cylindrical form, arranged with their outer peripheral surfaces in contact with the inner periphery of the cylindrical housing of the motor.

References Cited

UNITED STATES PATENTS

| | | | |
|---|---|---|---|
| 1,108,087 | 8/1914 | Tormin | 310—193 |
| 2,212,192 | 8/1940 | Howell | 310—152 X |
| 2,516,380 | 7/1950 | Goldschmidt | 310—182 |
| 3,401,282 | 9/1968 | Zagorski | 310—154 |

WARREN E. RAY, Primary Examiner

R. SKUDY, Assistant Examiner